(12) United States Patent
Munro

(10) Patent No.: US 11,016,179 B2
(45) Date of Patent: May 25, 2021

(54) DIGITAL IMAGE PROCESSING SYSTEMS FOR THREE-DIMENSIONAL IMAGING SYSTEMS WITH IMAGE INTENSIFIERS AND METHODS THEREOF

(71) Applicant: Munro Design & Technologies, LLC, Ontario, NY (US)

(72) Inventor: James F. Munro, Ontario, NY (US)

(73) Assignee: MUNRO DESIGN & TECHNOLOGIES, LLC, Ontario, NY (US)

( * ) Notice: Subject to any disclaimer, the term of this patent is extended or adjusted under 35 U.S.C. 154(b) by 0 days.

(21) Appl. No.: 16/208,204

(22) Filed: Dec. 3, 2018

(65) Prior Publication Data

US 2019/0174111 A1    Jun. 6, 2019

Related U.S. Application Data

(60) Provisional application No. 62/667,442, filed on May 5, 2018, provisional application No. 62/643,014, filed
(Continued)

(51) Int. Cl.
*G01S 7/481* (2006.01)
*G01S 17/36* (2006.01)
(Continued)

(52) U.S. Cl.
CPC ............ *G01S 7/4815* (2013.01); *G01S 7/484* (2013.01); *G01S 7/4816* (2013.01); *G01S 7/497* (2013.01);
(Continued)

(58) Field of Classification Search
CPC .... G01S 17/89; H04N 13/167; H04N 13/156; H04N 13/254; H04N 13/296
See application file for complete search history.

(56) References Cited

U.S. PATENT DOCUMENTS 3,868,536 A * 2/1975 Enck, Jr. ............... H01J 31/507
                                                    315/12.1
4,051,403 A * 9/1977 Feingold ............... H01J 31/507
                                                    313/105 CM
(Continued)

OTHER PUBLICATIONS

"Heterodyne", Nov. 13, 2018, 4 pages, Wikipedia, Retrieved from the Internet: <https://en.wikipedia.org/wiki/Heterodyne>.
(Continued)

*Primary Examiner* — Sarah Lhymn
(74) *Attorney, Agent, or Firm* — Troutman Pepper Hamilton Sanders LLP (Rochester)

(57) ABSTRACT

Methods and systems for the image processing of a three-dimensional imaging system include a multi-processor embodiment wherein the image output by an image sensor is divided amongst the several multi-processors for processing in order to improve the frame rate of the three-dimensional imaging system. Since the frame rate of a three-dimensional imaging system utilizing an image-intensifier is not limited by the amount of useful signal light available for imaging but is instead limited by image processing capacity, this technology provides for the use of multi-core or multi-processor image processing methods to improve the frame rate. Additionally, locating the image processor in close proximity to the image sensor allows for faster image data communication between the image sensor and image processor, which further improves the frame rate of the three-dimensional imaging system.

16 Claims, 5 Drawing Sheets

Related U.S. Application Data on Mar. 14, 2018, provisional application No. 62/593,970, filed on Dec. 3, 2017.

(51) Int. Cl.

| | |
|---|---|
| *H04N 5/238* | (2006.01) |
| *G01S 7/4911* | (2020.01) |
| *G01S 7/497* | (2006.01) |
| *G01S 7/484* | (2006.01) |
| *G01S 17/18* | (2020.01) |
| *G01S 17/34* | (2020.01) |
| *G01S 17/894* | (2020.01) |
| *H04N 13/254* | (2018.01) |
| *H04N 13/296* | (2018.01) |
| *H04N 5/235* | (2006.01) |
| *H04N 13/167* | (2018.01) |
| *H04N 13/156* | (2018.01) |
| *G06T 1/20* | (2006.01) |
| *G01S 13/34* | (2006.01) |

(52) U.S. Cl.
CPC ............. *G01S 7/4911* (2013.01); *G01S 17/18* (2020.01); *G01S 17/34* (2020.01); *G01S 17/36* (2013.01); *G01S 17/894* (2020.01); *G06T 1/20* (2013.01); *H04N 5/238* (2013.01); *H04N 5/2352* (2013.01); *H04N 13/156* (2018.05); *H04N 13/167* (2018.05); *H04N 13/254* (2018.05); *H04N 13/296* (2018.05); *G01S 13/342* (2013.01); *G06T 2200/04* (2013.01)

(56) References Cited

U.S. PATENT DOCUMENTS

| | | | | |
|---|---|---|---|---|
| 4,832,489 A | * | 5/1989 | Wyant | G01B 11/255 356/513 |
| 4,935,616 A | | 6/1990 | Scott | |
| 4,956,548 A | * | 9/1990 | Alfano | G01R 13/20 250/214 VT |
| 5,257,202 A | * | 10/1993 | Feddersen | G01N 21/6408 250/458.1 |
| 5,323,010 A | * | 6/1994 | Gratton | G01J 3/4406 250/458.1 |
| 5,865,754 A | * | 2/1999 | Sevick-Muraca | G01N 21/4795 600/476 |
| 6,288,776 B1 | | 9/2001 | Cahill et al. | |
| 6,584,283 B2 | | 6/2003 | Gabello et al. | |
| 6,707,054 B2 | | 3/2004 | Ray | |
| 6,856,382 B2 | | 2/2005 | Cahill et al. | |
| 6,925,195 B2 | | 8/2005 | Cahill et al. | |
| 6,950,135 B2 | | 9/2005 | Mckee et al. | |
| 8,254,665 B2 | | 8/2012 | Munro | |
| 2002/0072677 A1 | * | 6/2002 | Sevick-Muraca | A61B 5/415 600/473 |
| 2004/0169617 A1 | * | 9/2004 | Yelton | G06T 15/205 345/1.1 |
| 2009/0207179 A1 | | 8/2009 | Huang et al. | |
| 2013/0141550 A1 | | 6/2013 | Pockett | |
| 2014/0240469 A1 | * | 8/2014 | Lee | G01C 11/00 348/48 |
| 2014/0300701 A1 | | 10/2014 | Park et al. | |
| 2015/0288945 A1 | | 10/2015 | Nisenzon | |
| 2017/0287184 A1 | * | 10/2017 | Pettersson | G06T 11/60 |
| 2017/0300103 A1 | * | 10/2017 | Wei | G06F 3/0488 |
| 2018/0300098 A1 | * | 10/2018 | Vembar | G09G 5/363 |
| 2018/0300839 A1 | * | 10/2018 | Appu | H04N 19/156 |

OTHER PUBLICATIONS

"Frequency Synthesizer", Oct. 25, 2018, 6 pages, Wikipedia, Retrieved from the Internet: <https://en.wikipedia.org/wiki/Frequency_synthesizer>.
International Search Report and Written Opinion for PCT Application No. PCT/US18/63661, dated Feb. 21, 2019.

* cited by examiner

DIGITAL IMAGE PROCESSING SYSTEMS FOR THREE-DIMENSIONAL IMAGING SYSTEMS WITH IMAGE INTENSIFIERS AND METHODS THEREOF

This application claims the benefit of U.S. Provisional Patent Application Ser. No. 62/593,970, filed Dec. 3, 2017, U.S. Provisional Patent Application Ser. No. 62/643,014, filed Mar. 14, 2018, and U.S. Provisional Patent Application Ser. No. 62/667,442, filed May 5, 2018, which are all hereby incorporated by reference in their entirety.

FIELD

This technology generally relates to systems and methods for imaging and, more particularly, to systems and methods for high-resolution high-accuracy three-dimensional (3D) imaging of a 3D scene at video frame rates.

BACKGROUND

The state of the art in three-dimensional image-capturing technology has improved significantly in recent years, to the point where Video Graphics Array (VGA) level resolution, millimeter distance accuracy, and video frame rates can all be readily achieved when capturing three-dimensional (3D) images of target scenes several meters away from the imager. These impressive performance characteristics are made possible largely because of the addition of image intensifiers to time-of-flight 3D image-capturing systems such that 3D image-capturing systems are not light-starved. However, 3D imaging systems capable of even higher resolution, frame rates, accuracy, and range are highly desirable for use in, for example, autonomous vehicles.

Since 3D imaging systems are no longer light-starved due to the use of image intensifiers, the current limitation preventing further improvements to frame rates, resolution, accuracies, and measurement range is now the limited digital image processing capability available within the 3D image-capturing systems equipped with these image intensifiers. In particular, the digital image processors currently being used with 3D image-capturing systems are single processer devices that do not use parallel processing or multi-core computing processes. Indeed, as noted in U.S. Pat. No. 8,254,665 beginning at column 8, line 50, "By way of example only, the digital processing system 120 could be a conventional microprocessor with an external memory or digital processing system 120 can be a microcontroller with all memory located onboard. In another example, the digital processing system 120 could be a digital signal processor (DSP) integrated circuit, which is a microcomputer that has been optimized for digital signal processing applications, including Fourier transforms. The DSP integrated circuit could be as simple as a sixteen bit integer device for low-cost applications or the DSP can be a thirty-two bit or higher floating point device for higher performance when cost is not an issue." Accordingly with this prior technology, all the exemplary devices noted are non-parallel-processing single-processor devices.

SUMMARY

A three-dimensional (3D) imaging system includes an image capture system and an image processing system. The image capture system includes an image intensifier coupled to an image sensor which is configured to capture 2D images based on light reflected from a target. The image processing computing device is adjacent and coupled to the image capture system. The image processing system comprises two or more processors and a memory comprising programmed instructions stored thereon, the processors are configured to be capable of executing the stored programmed instructions to: break each of the 2D images into two or more 2D sub-images; allocate and communicate each of the 2D sub-images to one of the processors to execute one or more 3D image processing operations in parallel; collect 3D sub-image data resulting from the execution of the one or more 3D image processing operations from each of the processors; and assemble the collected 3D sub-image data into a unified 3D image of the target.

A method for making a three-dimensional (3D) imaging system includes providing an image capture system comprising an image intensifier coupled to an image sensor. The image sensor is configured to capture 2D images based on light reflected from a target. An image processing computing device is adjacent and coupled to the image capture system. The image processing system includes two or more processors and a memory comprising programmed instructions stored thereon, the processors configured to be capable of executing the stored programmed instructions to: break each of the 2D images into two or more 2D sub-images; allocate and communicate each of the 2D sub-images to one of the processors to execute one or more 3D image processing operations in parallel; collect 3D sub-image data resulting from the execution of the one or more 3D image processing operations from each of the processors; and assemble the collected 3D sub-image data into a unified 3D image of the target.

A three-dimensional imaging system includes an image intensification subsystem and an image sensing device whose output is coupled to a parallel-processing image-processing system in which the three-dimensional images are computed. The parallel-processing system can be one or more of an FPGA, multi-core CPU, or a GPU.

A three-dimensional imaging system includes an image intensification subsystem and an image sensing device whose output is coupled to a parallel-processing image-processing system in which the three-dimensional images are computed and wherein the image sensing device and parallel-processing image-processing system are in close proximity to one another.

A three-dimensional imaging system includes an image intensification subsystem and an image sensing device whose output is coupled to a parallel-processing image-processing system in which the three-dimensional images are computed and wherein the image sensing device and parallel-processing image-processing system are co-located within an enclosure.

Accordingly, this technology provides methods and systems for an improved digital imaging processing system for use with a 3D image-capturing system equipped with an image intensifier which will allow for increased frame rates, resolution, range accuracy, or range of the 3D image-capturing system.

DETAILED DESCRIPTION

Figure 1:
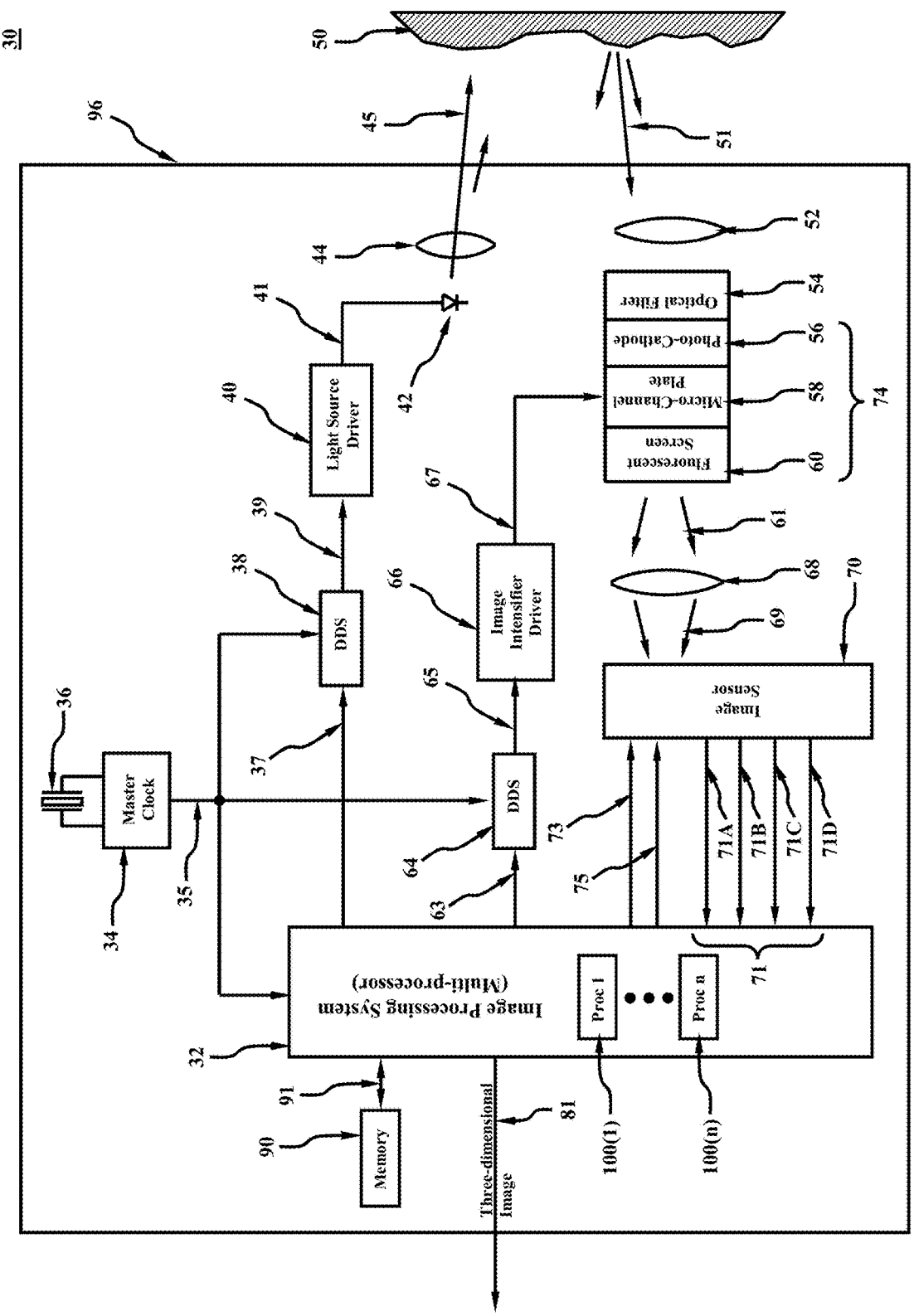
FIG. 1 is a block diagram of an example of a three-dimensional (3D) imaging system with a parallel-processor image processing system used to process images output by an image sensor.

An example of a three-dimensional (3D) imaging system 30, also known as range cameras or time-of-flight cameras, is illustrated in FIG. 1. The 3D imaging system 30 captures all the image information of a conventional two-dimensional monochrome camera, plus spatial information along one additional axis. Typically, this third axis is along a radial direction away from the three-dimensional imaging system 30, and the additional information is in the form of a distance measurement. The 3D imaging system 30 therefore measures the distance, or relative distance, to each image location in the target scene for each pixel comprising the captured image as described in greater below.

Referring more specifically to FIG. 1, the 3D imaging system 30 includes an image processing system 32, a common frequency source comprising master clock 34, a crystal oscillator 36, a first direct digital synthesizer (DDS) 38, and a second direct digital synthesizer (DDS) 64, a light emission system comprising a light source driver 40, a light source 42, and one or more light source lenses 44, and an image capture system comprising one or more imaging lens 52, an optical filter 54, an image intensifier 74, a relay lens 68, an image sensor 70, and an enclosure 96, although the 3D imaging system may comprise other types and/or numbers of other components or other elements in other configurations.

In this example, the image processing system 32 includes a memory 90 coupled to two or more processors 100(1) through 100(n), although the image processing system 32 can have other numbers or types of components or other elements in other configurations. In particular, in this example the image processing system 32 comprises a single device having multiple processors, although other configurations may be used, such as having multiple devices each having a single processor or multiple devices each having multiple processors by way of example only. The memory 90 can store programmed instructions as well as data for capturing and generating a three-dimensional image as described and illustrated by way of the examples herein, although some or all of these instructions and data may be stored elsewhere. A variety of different types of memory storage devices, such as a random access memory (RAM), a read only memory (ROM), hard disk, CD ROM, USB thumb-drive, or other computer readable medium which is read from or written to by a magnetic, optical, or other reading or writing system coupled to the image processing system 32, can be used for the memory.

Additionally, the image processing system 32 has: a tuning word output 37 coupled to an input of a first direct digital synthesizer (DDS) 38; another tuning word output 63 coupled to an input of a second direct digital synthesizer (DDS) 64; a shutter control signal 73 output coupled to an input of image sensor 70; a bi-directional image sensor control bus 75 coupled to an image sensor 70; a series of image sensor output lines 71A through 71D inputs coupled to corresponding outputs of image sensor 70 over which digitized images captured by image sensor 70 are sent to the image processing system 32; a three-dimensional image output 81 line coupled to an external device (not shown); a bi-directional memory bus 91 coupled to a bank of memory 90; and a master clock signal 35 input coupled to an output of master clock 34, although the image processing system 32 may have other types and/or numbers of other inputs or outputs.

The common frequency source has a master clock 34 coupled to a crystal oscillator 36 which is coupled to the first DDS 38 and second DDS 64, although other types frequency sources with other components or elements in other configurations may be used. In this example, the crystal oscillator 36 generates a frequency utilized by the master clock 34 to generate the master clock signal 35. The master clock signal 35 of the master clock 34 is also coupled to an input of the first direct digital synthesizer (DDS) 38 and an input of the second direct digital synthesizer (DDS) 64.

The first DDS 38 and second DDS 64 are frequency-synthesizing electronic circuits that are used to generate and output a wide range of frequencies and phase from an input reference frequency. A DDS works by way of converting the input frequency to an output frequency according to the formula $f_{out}=f_{in} \times TW/2^{32}$, where $f_{out}$ is the output frequency (i.e., the frequency of first DDS output 39), $f_{in}$ is the input frequency (i.e., the frequency of the reference clock signal 35), and TW is a tuning word programmed into the DDS. As an example, if $f_{in}=f_{clk}=134,217,728$ Hertz, TW is 800,000,000, then $f_{out}=25,000,000$ Hertz. As another example, if $f_{in}=f_{clk}=134,217,728$ Hertz, $TW_2$ is 800,000,512, then $f_{out}=25,000,016$ Hertz. The first DDS 38 and the second DDS 64 each have an input coupled to an output of the master clock 34, although other types and/or numbers of frequency generators may be used. The first DDS 38 has a DDS output 39 coupled to an input of the light source driver 40 and the second DDS 64 has a DDS output 65 coupled to an input of an image intensifier driver 66 which has an output 67 coupled to an input of the image intensifier 74.

The light emission system has a light source driver 40 coupled to a light source 42 with one or more light source lenses 44 positioned to direct light from the light source towards a target 50, such as a target scene or target object by way of example, although other types light emission systems with other components or elements in other configurations may be used. The light source driver 40 circuit accepts as an input the first DDS output 39 signal produced by first DDS 38 and produces a light source drive signal 41, which is a substantially higher-powered electronic signal, that is coupled to an input of the light source 42. The light source 42 thereupon emits illuminating light 45 in accordance with the light source drive signal 41 through one or more light source lenses 44 such that the illuminating light 45 emitted by the light source 42 is focused and directed onto a target 50.

The image capture system has one or more imaging lens 52, an optical filter 54, an image intensifier 74, one or more relay lenses 68, and an image sensor 70, although the image capture system may comprise other types and/or numbers of other components or other elements in other configurations. A portion of illuminating light 45 is back-reflected from the target 50 and is shown as back-reflected light 51 in FIG. 1. A portion of back-reflected light 51 is then incident on imaging lens 52 which causes an image of the target 50 to be focused on photocathode 56 of image intensifier 74 through optical filter 54. Light that is imaged onto the photocathode 56 of the image intensifier 74 is converted into electrons by the photocathode 56, the electrons then enter the micro-channel plate 58 section of the image intensifier 74 and are amplified or intensified by several orders of magnitude, and accelerated, before striking the fluorescent screen 60 section of the image intensifier 74. Consequently, an amplified or intensified image of the image focused on the photocathode 56 is generated and presented on the fluorescent screen 60 of the image intensifier 74.

At the same time the image intensifier driver 66 circuit accepts as an input the second DDS output 65 of second DDS 64 and produces a substantially higher-powered electronic image intensifier drive signal 67 output that is coupled to the microchannel plate 58 section of the image intensifier 74. The gain of image intensifier 74 then varies in accordance with the voltage of the image intensifier drive signal 67 applied to the microchannel plate 58 section of image intensifier 74.

Screen output light 61 emitted by the fluorescent screen 60 of the image intensifier 74 enters a relay lens 68 which causes an image of the image presented on the fluorescent screen 60 to be formed on the light-sensitive input face of image sensor 70. The image sensor 70 thereupon captures the image, converts the image into an electronic format, and transmits the electronic image to the image processing system 32 over the series of image sensor output lines 71A through 71D. Note that an image captured by image sensor 70 is a two-dimensional (2D) image comprising a map or array of intensity variations in the up/down and side-to-side directions but no depth information.

The image sensor 70 has several characteristics that must be considered for use with examples of this technology. For example, the frame rate of the image sensor 70 must be at least as fast as the desired frame rate of the three-dimensional imaging system 30. Image sensor 70 need not be a color image sensor because the fluorescent screen 60 outputs a substantially monochrome image. However, image sensor 70 must have good SNR characteristics (e.g., an SNR of at least 40 dB) and a dynamic range equivalent to at least 10-bits of gray depth to minimize quantization noise. The resolution, or pixel count of the image sensor 70 is also important, with 800×600 pixel-resolution, or even 1280×1024 pixel-resolution being readily available and consistent with the resolution of the image intensifier 74. One suitable off-the-shelf image sensor is the NOIV1SN1300 from On Semiconductor (Phoenix, Ariz., 85008 USA), which is monochromatic, has 1280×1024 pixel resolution, and can operate at up to 150 frames per second. Furthermore, the NOIV1SN1300 has four LVDS output lines operating in parallel over which the image data is conveyed from the NOIV1SN1300 image sensor 70 to the image processing system 32 to facilitate the parallel processing functionality of image processing system 32.

The enclosure 96 comprises one or more sections that are mechanically attached together to form a housing that substantially encloses the 3D imaging system 30, although other types of enclosures with other configurations may be used. In this example, one enclosure section can be relatively thick and rigid which can serve as a base for mounting the 3D imaging system 30 onto a tripod, for example: as a heat sink or conduit for managing and dissipating waste heat generated by the circuitry of the 3D imaging system 30 including the waste heat generated by the image processing system 32; as a base or frame on which various circuit boards containing the circuitry of the 3D imaging system 30 are mounted; as a base or frame on which optical filter 54 or imaging lens 52 are mounted; and as a base or frame on which sheet metal covers associated with the enclosure 96 are attached, although other configurations of the enclosure 96 are possible as well, including wherein two or more sections of relatively thick and rigid material are mechanically attached to form a base.

Figure 2:
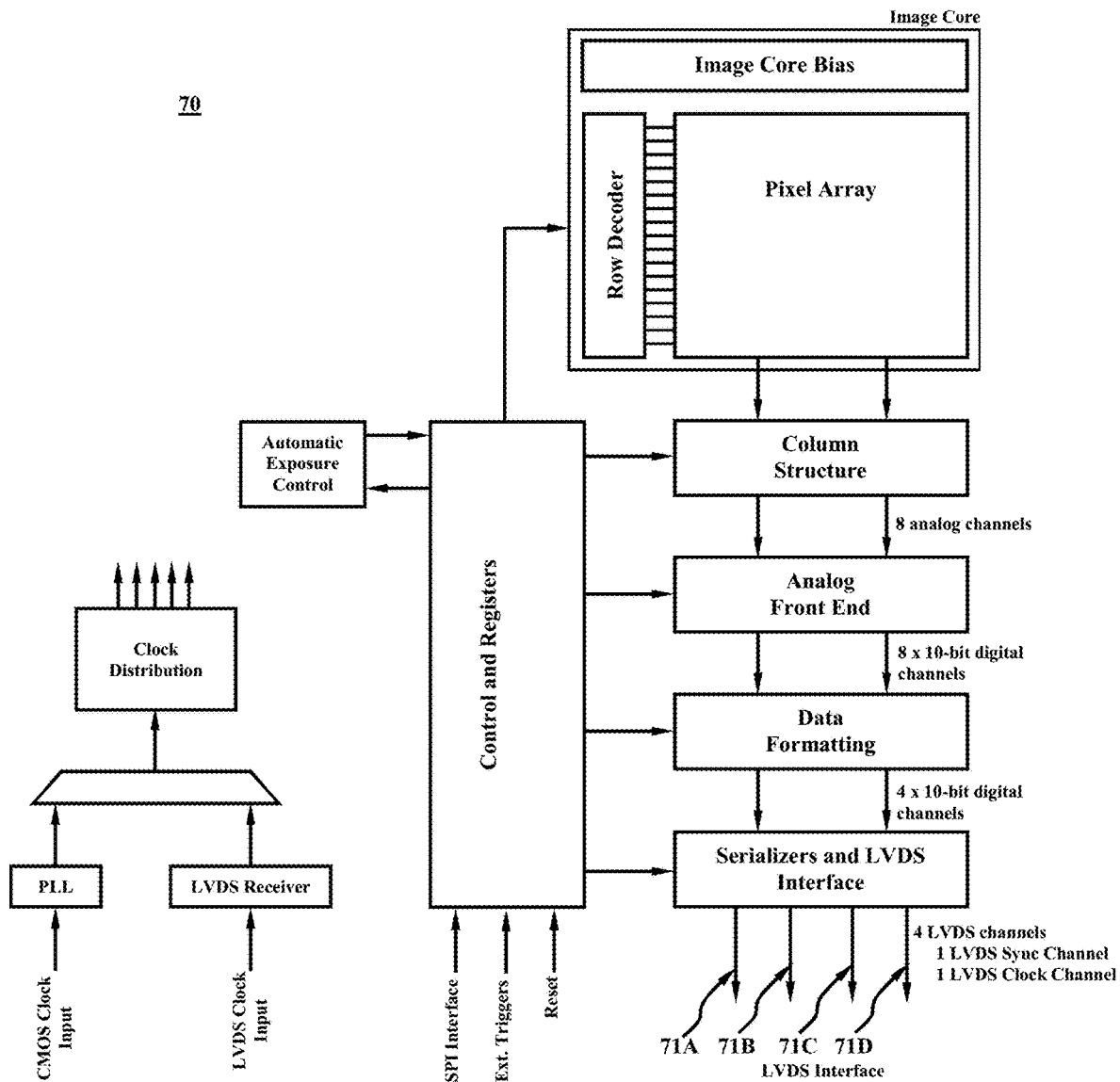
FIG. 2 is a block diagram of an example of an image sensing device having multiple image sensor output lines used in the 3D imaging system illustrated in FIG. 1.
Figure 3:
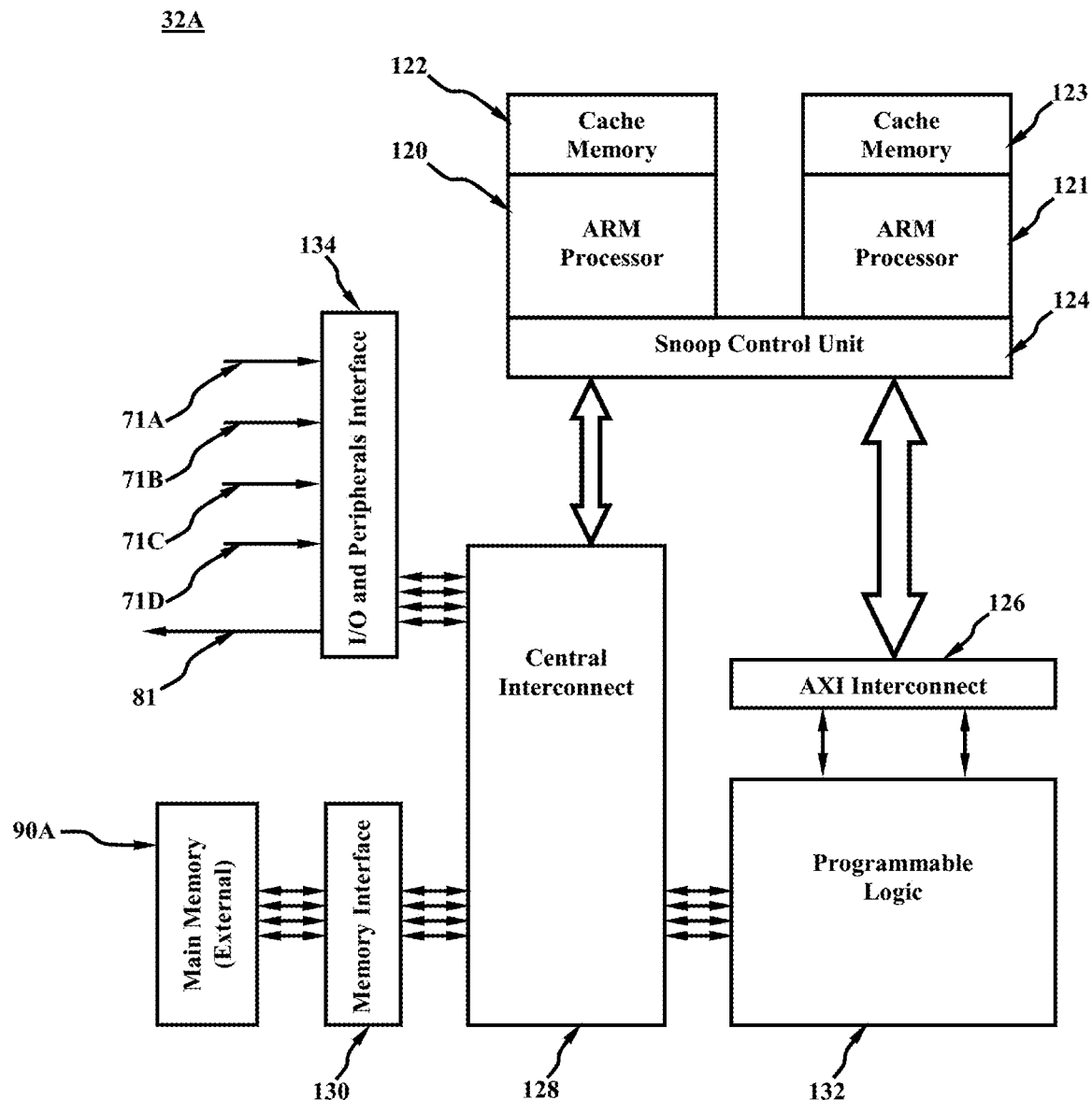
FIG. 3 is a block diagram of an example of a multiple-input field programmable gate array (FPGA) that can be used as the image processing system in the 3D imaging system illustrated in FIG. 1.
Figure 4:
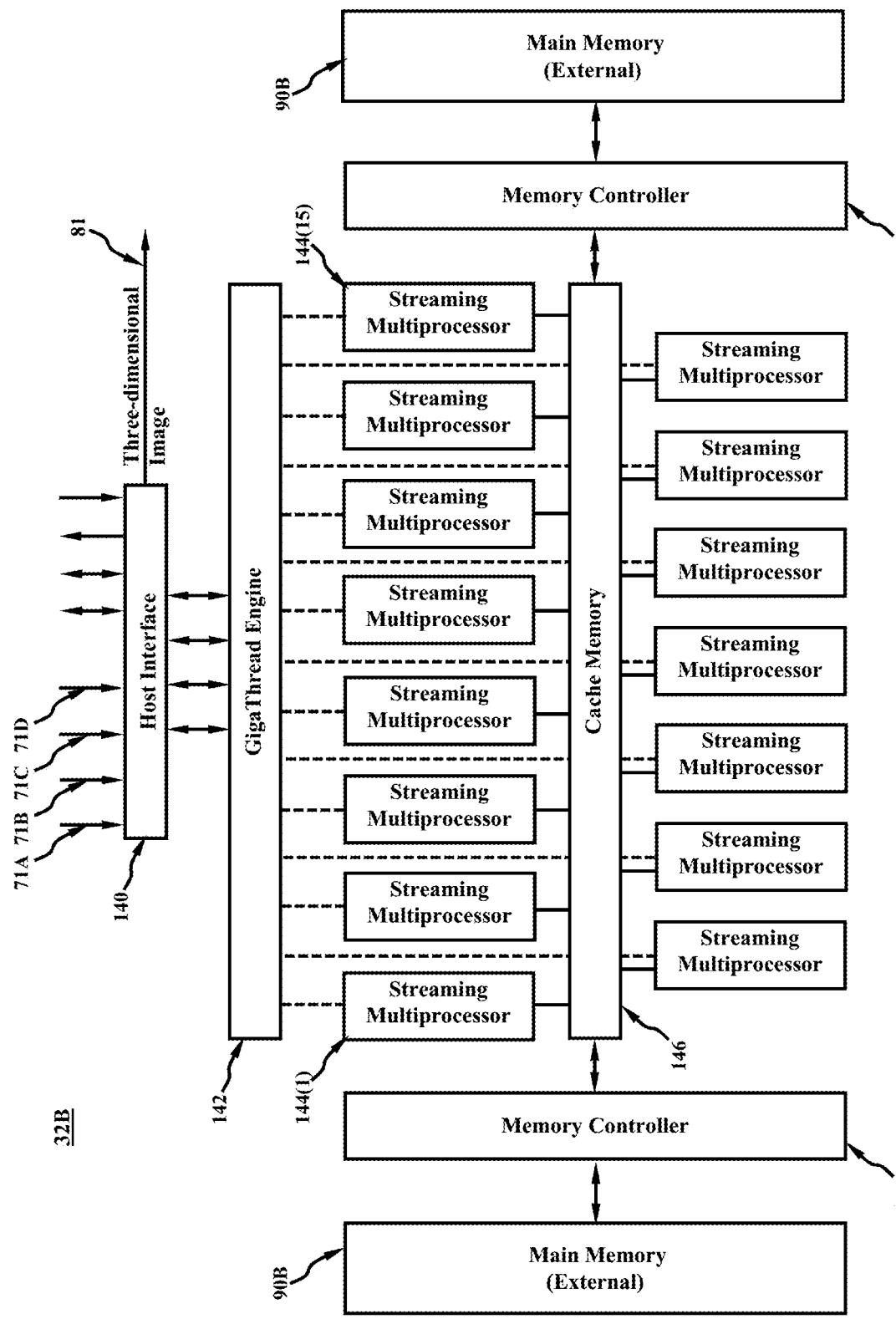
FIG. 4 is a block diagram of an example of a multiple-input graphics-processing unit (GPU) that can be used as the image processing system in the 3D imaging system illustrated in FIG. 1.

Referring to FIGS. 1-5, the operation of the 3D imaging system 30, in particular with respect to the image processing systems 32, as well as with examples of other alternatives of image processing system shown as image processing system 32A in FIG. 3, image processing system 32B in FIG. 4, and image processing system 32C in FIG. 4 will now be described below.

The image processing system 32 has two or more digital processors which are configured to operate in parallel to meet the pixel processing throughput requirements of a 3D imaging system 30 utilizing an image intensifier 74 which would not be satisfied by a single CPU or DSP. With these two or more digital processors executing in parallel within image processing system 32, a 2D image being processed can be readily divided into two or more 2D sub-images, and equations 3, 9, and 10 (discussed below) can be executed by each of these processors within image processing system 32 on their own specific set of pixels of their sub-image. As an example, if there are eight processors operating in parallel with the image processing system 32, and if there are 1280×1024=1,310,720 pixels within a 2D image, then a sub-image comprises 1,310,720/8=163,840 pixels, and each of the eight processors can execute equations 3, 9, and 10 on their own specific set of 163,840 pixels. Note that there will be some processing overhead required to break each 2D image into 2D sub-images and allocating and communicating the sub-image data to each of the processors, as well as collecting the 3D image data resulting from the execution of equations 3, 9, and 10 from each processor and assembling the eight 3D sub-image data into a unified 3D image of the target 50. In examples of this technology, the number of processors in the image processing system 32 may range between two and 4096 processors, although other ranges could be used.

The overhead associated with splitting the image data into 2D sub-images can be simplified if the number of 2D sub-images is equal to the number of image sensor output lines 71 associated with the image sensor 70. As an example, as seen in FIG. 2, the example of the image sensor 70 has four image sensor output lines, 71A, 71B, 71C, and 71D. Since the image sensor 70 has 1280×1024=1,310,720 pixels total, then 1,310,720/4=327,680 pixels of each 2D sub-image will be transmitted over each of the four image sensor output lines 71A-71D per image frame. The receiving end of each of the four image sensor output lines, 71A, 71B, 71C, and 71D, can be an input to four corresponding processors comprising image processing system 32.

In this example, the image sensor 70 is not a camera, but a semiconductor device with an array (typically a 2D array, although a 1D array or linear array is also possible) of photosensitive picture elements (or "pixels") that each produces an electronic signal whose amplitude is proportional to the amount of light incident upon a photosensitive picture element during the shutter open interval. After the shutter closes (i.e., when the image sensor shutter signal 73 is de-asserted) these analog pixelated signals are then read out from the array and are digitized with one or more analog-to-digital converters that reside on the image sensor 70 chip. These digitized pixel values are then stored on the image sensor 70 until they are output to an external device such as image processing system 32.

By way of further example, the image processing system 32 could be a conventional multi-microprocessor with an external memory or the image processing system 32 can be a multi-microcontroller with all or some memory located onboard. In another example, the image processing system 32 could be a multi-digital-signal-processor (DSP) integrated circuit (or multiple integrated circuits), which is a multi-microcomputer that has been optimized for digital signal processing applications, including Fourier transforms. The image processing system 32 also could be as simple as a sixteen-bit integer system for low-cost applications or the image processing system 32 can be a thirty-two bit or sixty-four bit or higher floating-point device or system for higher performance when cost is not an issue. Further, by way of example only and as noted earlier, the image processing system 32 can be one or more FPGA (Field-programmable gate array) devices as shown and described herein with reference to FIG. 3 or one or more complex programmable logic device (CPLD) devices, one or more graphics processing unit (GPU) devices as shown and described herein with reference to FIG. 4, one or more multi-core CPU devices as shown and described herein with reference to FIG. 5, or a combination of one or more of these.

Referring to FIG. 3, an example of a multiple-input field programmable gate array (FPGA) 32A that can be used as the image processing system 32 in the 3D imaging system 30 is illustrated. In this example, the FPGA 32A comprises first ARM processor 120 having cache memory 122, second ARM processor 121 having cache memory 123 where first ARM processor 120 and second ARM processor 121 are each coupled to a snoop control unit 124. Snoop control unit in turn is coupled to a programmable logic 132 by way of AXI Interconnect 126. Also provided is a central interconnect 128 which is also coupled to programmable logic 132, snoop control unit 124, memory interface 130 which in turn is coupled to external memory 90A, and the I/O and peripherals interface 134 which in turn is coupled to the external image sensor 70 by way of images sensor output lines 71A through 71D, although this image processing system may comprise other types and/or numbers of other components or elements in other configurations.

In this example, the image processing system 32 is implemented as a field programmable gate array (FPGA) 32A, such as the Zynq-7100 from Xilinx, Inc (San Jose, Calif. 95124), which can accept master clock signal 35 speeds up to 1 GHz, can have up to 444,000 configurable logic cells, and can also be provided with an on-chip ARM Cortex serial processor that is tightly coupled to the programmable logic array fabric of FPGA 32A. The first ARM processor 120 can be particularly useful for breaking the raw image data from the image sensor 70, received through images sensor output lines 71A through 71D, into several sub-images, and routing the sub-images to the many processor slices programmed into the programmable logic of the FPGA 32A. Note that each processor slice executes equations 3, 9, and 10 on each of their particular set of pixels, serially, to create a 2D sub-image. The second ARM processor 121 can be particularly useful for re-combining the 3D sub-image data produced be each of the processor slices of the programmable logic into a single unitary 3D image, and then outputting the resulting 3D image from the 3D imaging system 30 to an outside device by way of the 3D image output 81 line. Data can be stored by the ARM processors 120 and 121 or programmable logic 132 in memory 90A, before, during, and after the execution of equations 3, 9, and 10. The 444,000 configurable logic cells provided within the Zynq-7100 can be configured to operate as some 2020 individual processors, in which case a 1280× 1024=1,310,720 pixel image can be broken evenly into 1280 sub-images comprising 1024 pixels each wherein each of the 1280 sub-images is processed by one of 1280 (of 2020) processors, in parallel, wherein each of the 1280 processes executes equations 3, 9, and 10 during the (concurrent) processing.

In this example, output lines from image sensor 70 must be kept physically short, and the FPGA 32A must located less than 20 cm from image sensor 70, preferably less than 8 cm from image sensor 70, or more ideally less than 4 cm away from the image sensor 70 to maximize the data communication rate between the image sensor 70 and FPGA 32A. Therefore, the FPGA 32A and image sensor 70 should be adjacent and reside within the same enclosure 96. Further, although this example focuses on the use of an FPGA 32A as the image processing system 32, a related device, in other examples a CPLD (complex programmable logic device) can be used instead. While a CPLD has programmable logic like an FPGA, a CPLD has fewer programmable cells and is a less-costly alternative to an FPGA. One CPLD suitable for use as an image processor is the XC2C512, also from Xilinx.

Referring to FIG. 4, an example of a multiple-input graphics-processing unit (GPU) 32B that can be used as the image processing system 32 in the 3D imaging system is illustrated. In this example, the GPU 32B comprises a host interface 140 coupled to images sensor output lines 71A through 71D from image sensor 70. Host interface 140 is also coupled to a Giga Thread Engine 142 and to a 3D image output 81 line, and Giga Thread Engine 142 in turn is coupled to a plurality of streaming multiprocessors 144(1) through 144(15) which in turn are coupled to the a cache memory 146. Cache memory 146 is also coupled to a pair of memory controllers 148 and 149 and memory 90B coupled in series to the cache memory 146, although this image processing system may comprise other types and/or numbers of other components or elements in other configurations.

In this example, GPU 32B, such as the TeslaK20X from Nvidia, Corp (Santa Clara, Calif. 95051), can accept master clock signal 35 speeds up to 730 MHz, has fifteen Streaming Multiprocessors each having 192 cores for a total of 2880 processors, and also has a GigaThread Engine that is tightly coupled to the Streaming Multiprocessors. The GigaThread Engine can be particularly useful for breaking the raw image data from the image sensor 70, received through images sensor output lines 71A through 71D, into several sub-images, and routing the sub-images to the processors within the Streaming Multiprocessors of the GPU 32B. Note that each of the processors in GPU 32B executes equations 3, 9, and 10 on each of their particular set of pixels to create 3D sub-image data. The GigaThread Engine also can be particularly useful for re-combining the 3D sub-image data produced be each of the processors of the fifteen Streaming Multiprocessors into a single unitary 3D image, and then outputting the resulting 3D image from the 3D imaging system 30 to an outside device by way of the 3D image output 81 line. Note, as shown in FIG. 4, the presence of the memory 90B in which data can be stored by the processors, Streaming Multiprocessors, or GigaThread Engine, before, during, and after the execution of equations 3, 9, and 10. Of the 2880 individual processors, some 2048 can be utilized for the execution of equations 3, 9, and 10, in which case a 1280×1024=1,310,720 pixel image can be broken evenly into 640 sub-images comprising 512 pixels each wherein each of the 2048 sub-images is processed by one of 2048 (of 2880) processors of GPU 32B, in parallel, wherein each of the 2048 processes executes equations 3, 9, and 10 during the (concurrent) processing.

As mentioned above, the image sensor output lines 71A to 71D must be kept physically short, and the GPU 32B must located less than 20 cm from image sensor 70, preferably less than 8 cm from image sensor 70, or more ideally less than 4 cm away from the image sensor 70 to maximize the data communication rate between the image sensor 70 and GPU 32B. Therefore, in this example the GPU 32B and image sensor 70 are adjacent and can reside within the same enclosure 96.

Figure 5:
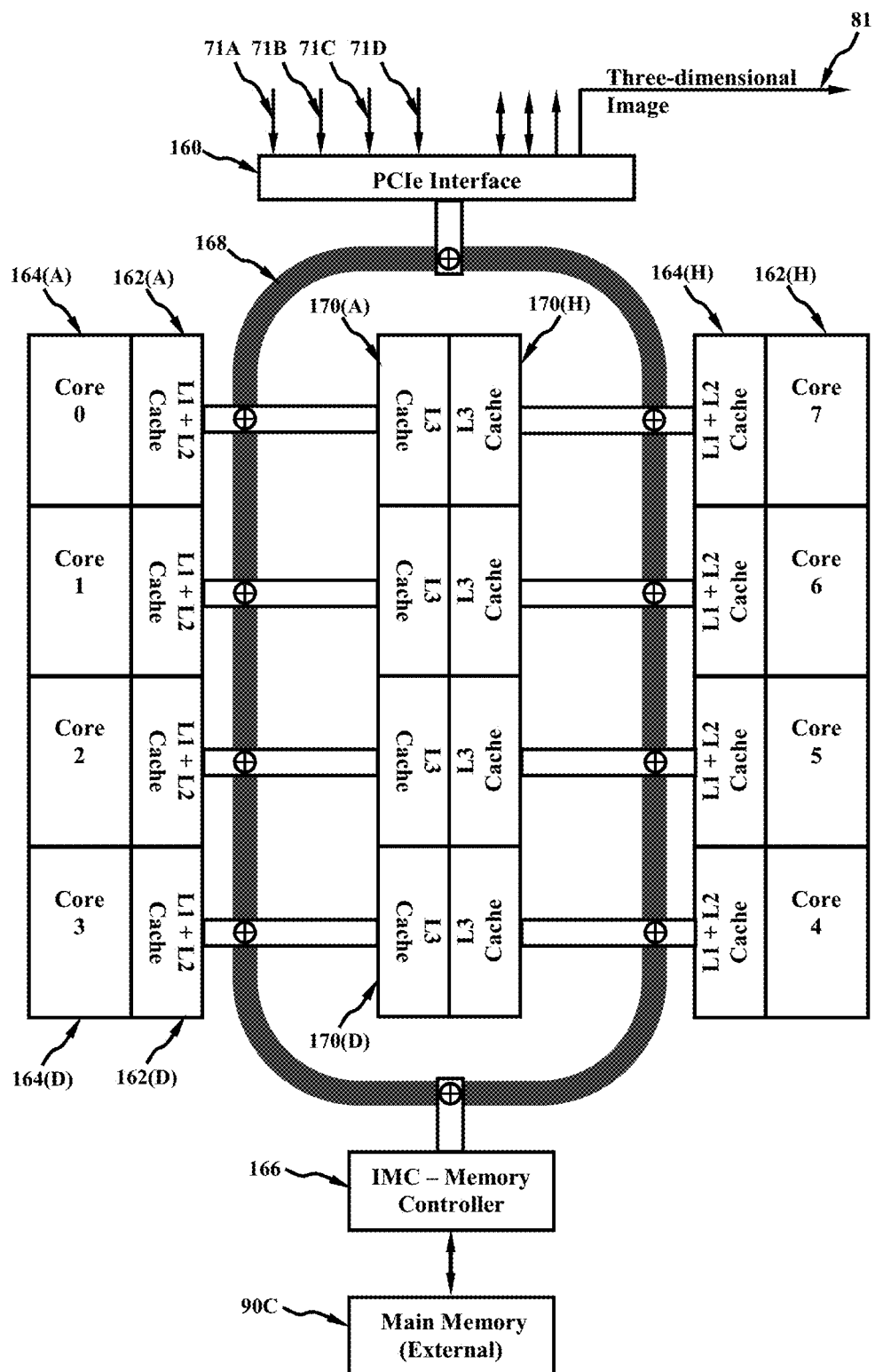
FIG. 5 is a block diagram of an example of a multiple-input multi-core central processing unit (CPU) that can be used as the image processing system in the 3D imaging system illustrated in FIG. 1.

Referring to FIG. 5, an example of a multiple-input multi-core central processing unit (CPU) 32C that can be used as the image processing system 32 in the 3D imaging system is illustrated. In this example, the CPU 32C comprises a PCIe interface 160 coupled between images sensor output lines 71A through 71D from image sensor 70 and data bus 168. Data bus 168 couples together the L3 caches 170(A) through 170(H), L1 and L2 caches 162(A) through 162(H), and IMC Memory Controller 166. Coupled to each of L1 and L2 cache 162(A) through 162(H), is one of a core processor 164(A) through 164(H). IMC Memory Controller 166 is also coupled to a main memory 90C. Note the multiple-input multi-core central processing unit (CPU) 32C described above may comprise other types and/or numbers of other components or elements in other configurations.

In this example, CPU 32C, such as the "Skylake" architecture from Intel, Corp (Santa Clara, Calif. 95051), can accept master clock signal 35 speeds up to 4.0 GHz, and has eight core processors. Four or more, such as eight by way of example, image sensor output lines 71 are coupled to the core processors 0-7 through the PCIe Interface. Each core processor of multi-core CPU 32C can receive a sub-image from the image sensor 70, received through images sensor output lines 71A through 71D. Each core-processor of multi-core CPU 32C executes equations 3, 9, and 10 on each of their particular set of pixels, serially, to create 3D sub-image data. After equations 3, 9, and 10 are executed for each pixel, a re-assembled 3D image is then output through the PCIe interface through the 3D imaging system 30 to an outside device by way of the 3D image output 81 line. Note, as shown in FIG. 5, the presence of memory 90C in which data can be stored by the core processors before, during, and after the execution of equations 3, 9, and 10. Each of the eight core processors can be utilized for the execution of equations 3, 9, and 10, in which case, for example, a 1280×1024=1,310,720 pixel image can be broken evenly into eight sub-images comprising 163,840 pixels each wherein each of the eight sub-images is processed by one of the eight core processors, in parallel, wherein each of the eight core processors executes equations 3, 9, and 10 during the (concurrent) processing.

As mentioned above, in these examples the image sensor output lines 71 must be kept physically short and the CPU 32C must located less than 20 cm from image sensor 70, preferably less than 8 cm from image sensor 70, or more ideally less than 4 cm away from the image sensor 70 to maximize the data communication rate between the image sensor 70 and multi-core CPU 32C. In this example, the CPU 32C and image sensor 70 are adjacent and reside within the same enclosure 96. Although this example focuses on the use of a multi-core CPU 32C as the image processing system 32, a related device, a multi-core DSP (digital signal processor) can be used instead. A multi-core DSP is similar to a multi-core CPU, but has an internal architecture and program set that has been optimized for signal processing functions, including Fourier Transforms. One multi-core DSP suitable for use as an image processor 32 is the six-core MSC8256 device from NXP Semiconductors (Eindhoven, The Netherlands).

The algorithmic computations taking place within the image processing system 32 and the alternative examples flows from the need to perform phase and amplitude calculations of a Discrete Fourier Transform (DFT) for each pixel of the three-dimensional image; this need in turn follows from the heterodyne (or homodyne) signal output by the fluorescent screen 60 of the image intensifier 74. The mathematics of the heterodyne and DFT processes are provided below.

As noted earlier the ability of the intensification gain of image intensifier 74 to be controlled in accordance with intensifier drive signal 67 leads to the ability of image intensifier 74 to effect a heterodyning or homodyning process. In the image intensifier's 74 heterodyning or homodyning process the image signal within the microchannel plate 58 (originating with the photocathode 56 image) is multiplied with the image intensified drive signal 67. Note that homodyning is the same as heterodyning except in homodyning the two frequencies being multiplied are substantially the same and the phase of one of the signals is being varied. The output of the heterodyning or homodyning process is presented on the fluorescent screen 60 of the image intensifier 74, which mathematically is represented as Equation 1:

$$FS_i(t) = O_{FS} + A_{FS}\cos(2\pi f_{fs}t - \phi_i). \qquad \text{Equation 1}$$

Equation 1 tells us that the brightness of the fluorescent screen 60 at the location of the i'th pixel varies sinusoidally in time, t, at a frequency of $f_{fs}$, and with a phase $\phi_i$. The frequency term, $f_{fs}$, is equal to the difference between the frequency of the image intensifier drive signal 67 (namely $f_{mcp}$) and the frequency of the light source drive signal 41 (namely $f_{illum}$). As an example, if $f_{mcp}$ is 25,000,016 Hz and $f_{illum}$ is 25,000,000 Hz, then $f_{fs}$=25,000,016−25,000,000 Hz=16.0 Hz. This means that the brightness of the image present on the fluorescent screen 60 will vary sinusoidally at a rate of 16.0 cycles/second, in this example. Note that both the image sensor 70 and fluorescent screen 60 are operative at this relatively low frequency.

The phase term $\phi_i$ carries information about the distance to the target 50. The phase of the i'th pixel varies as a function of emission modulation frequency, $f_{illum}$, and distance, $d_i$, to the target 50 at the location corresponding to the i'th image sensor pixel according to the formula:

$$\phi_i = \frac{4\pi f_{illum} d_i}{c} + \frac{N\pi}{2} \qquad \text{Equation 2}$$

where c is the speed of light. In heterodyne operation, N=0, and the phase is not varied in π/2 steps within the image intensifier drive signal 67 or the light source drive signal 41. However, in homodyne operation where $f_{fs}$=0.0 Hz, the phase of either the image intensifier drive signal 67 or the light source drive signal 41 is incremented by π/2 radians between successive frames captured by image sensor 70, assuming a four-point DFT. As a heterodyne example, if $f_{illum}$ is 25,000,000 Hz, c=3×10$^8$ m/s, and $d_i$=3 meters, then the phase $\phi_i$ associated with the i'th pixel is π radians. Knowing the phase associated with each pixel, or the relative phase of a pixel relative to the other pixels in a phase-image or phase-map allows one to determine the relative distance of one pixel relative to the relative distances of the others by re-arranging Equation 2 to form Equation 3:

$$d_i = \frac{c\phi_i}{4\pi f_{illum}}$$ Equation 3

Therefore, the next step is to mathematically determine the phase, or relative phase, $\phi_i$, at each of the i'th pixels in order to develop phase and distance maps.

One way to compute the phase of a sinusoidal waveform—or the phase of any repeating or cyclical waveform—is with the use of a Fourier Transform. The mathematical definition of a Fourier Transform is $$X(m) = \sum_{k}^{N-1} x_k \left[ \cos\frac{2\pi mk}{N} + i\sin\frac{2\pi mk}{N} \right]$$ Equation 4 where $x_k$ is the k'th sample along one cycle of the sinusoid whose phase is to be determined (namely $FS_i(t)$), k is the sample counter, $X(m)$ is the frequency domain signal and is a complex number, m is the frequency counter, N is the number of signal samples used in calculating the transform, and i is the square root of −1. $X(m)$, being a complex number, can be restated as:

$$X(m) = Re(m) + i\,Im(m)$$ Equation 5

Where Re is the real part and Im is the imaginary part. The magnitude of the m'th frequency component is $$A(m) = \sqrt{Re^2(m) + Im^2(m)}$$ Equation 6 and the phase of the m'th frequency is $$\phi(m) = \tan^{-1}\frac{Im(m)}{Re(m)}.$$ Equation 7

For distance estimation, only the phase of the fundamental frequency m=1 is required. Further simplifications can be made by sampling the sinusoid exactly four times per cycle (i.e., π/2 radians apart), which results in what is known as a four-point Discrete Fourier Transform (DFT). For this four-point transform, where N=4 and k=0, 1, 2, and 3, Equation 4 simplifies to $$X(1) = x_0 + ix_1 - x_2 + ix_3$$ Equation 8

It is seen that $Re(1) = x_0 - x_2$ and $Im(1) = x_1 - x_3$, and the phase at the i'th pixel is $$\phi = \tan^{-1}\frac{x_1 - x_3}{x_0 - x_2}$$ Equation 9 and the amplitude at the i'th is $$A = \sqrt{(x_0 - x_2)^2 + (x_1 - x_1)^2}.$$ Equation 10

The phase and amplitude determinations are made from only four data points or samples, $x_0$, $x_1$, $x_2$, and $x_3$, obtained directly from the signal FS(t), for each pixel. Furthermore, each of the four frames will be 90° apart along the FS(t) waveform, and each frame contains an $x_m$ data point for all of the pixels of the digitized image. In particular, the first image frame captured by the image sensor 70 has the $x_0$ data for all of the pixels of the digitized image, the second image frame captured by the image sensor 70 has the $x_1$ data for all of the pixels of the digitized image, the third image frame captured by the image sensor 70 has the $x_2$ data for all of the pixels of the digitized image, and the fourth (and last, assuming a 4-pt DFT) image frame captured by the image sensor 70 has the $x_3$ data for all of the pixels of the digitized image.

The first, second, third, and fourth images are transmitted by the image sensor 70 over image sensor output lines 71A through 71D in this example to the image processing system 32 as the images are captured. Next, the image processing system 32 receives these images in sequence as the images are captured, and processes the $x_0$, $x_1$, $x_2$, and $x_3$ data as described above to compute the phase and amplitude for each pixel. Image processing system 32 then converts the phase, $\phi$, information to distance by use of the Equation 3 for each pixel of the image. The image processing system 32 can then arrange the pixel amplitude data into a two-dimensional array which is used to represent the relative reflectance of each point in the target object or target 50 corresponding to the location in the two-dimensional array, meaning the array is substantially a standard monochrome bitmapped image of the target 50. Finally, the image processing system 32 arranges the pixel distance data into a two-dimensional array which is used to represent the relative distance of each point in the target 50 corresponding to the location in the two-dimensional array, meaning the array is a "distance image" of the target 50.

In nearly all 3D imaging systems, including with examples of this technology, examples of four key performance criteria are the frame rate measured in 3D frames per second, the maximum usable range over which 3D images can be captured, measured in meters, the accuracy of the distance of each pixel, expressed in millimeters, and the resolution of the 3D images, expressed by the pixel count. Generally these four parameters can be traded off with one another. For example, if the frame rate is reduced by half such that the exposure time of a frame captured by an image sensor is doubled, then the maximum range can be increased by the square-root of two, or 41%. Another example is where the pixel count is quadrupled, such as from 320×240 pixels to 640×480 pixels, wherein the area of each pixel is also reduced by a factor of four and receives one-fourth the amount of light compared to a lower resolution pixel of a 320×240 image. In this example the frame rate can be correspondingly reduced by a factor of two to maintain the maximum usable range, or the maximum range can be reduced instead.

When an image intensifier 74 is provided in the optical path, then the optical gain provided by the image intensifier 74 can be used to improve one or all of the four key performance parameters. For example, if the gain of the image intensifier is 10,000, then that gain can be used to improve the maximum range of a 3D imager by the square-root of 10,000, or a factor of 100. While this may be desirable in some applications, in most applications it is desirable to apply some of the gain to improved resolution, such as to a resolution of 1280×1024 pixels (1,310,720 total pixels) which is an increase of over 17× above the 320×240 pixels (76,800 total pixels) of the example cited above. If all else is the same (such as the image sensor's active area), then the area of each high-resolution pixel is $\frac{1}{17}^{th}$ the area of a low resolution pixel, meaning an improvement of 10,000/17=588 is still available for increasing range, accuracy, or frame rate. In most applications it is beneficial to increase the frame rate of the 3D imaging system, such as for example, increasing the frame rate from 15 frames/second to 120 frame/second, or a factor of 8×. Note this still leaves a factor of 588/8=73 available for improving the accuracy and the maximum range of the 3D imaging system.

In the example cited above, in a low-resolution 3D imaging system operating at 15 frames/second and 320×240 pixels/frame (which heretofore has been the state of the art in non-intensified 3D imaging systems), equations 3, 9, and 10 must be executed 15×320×240=1,152,000 times per second, which can be performed on single-processor CPU's or DSP's as discussed in the Background section of this disclosure. However, in high-resolution 3D imaging system 30 utilizing an image intensifier 74, in which 120 frames/second of 1280×1024 pixels are captured in each frame, then equations 3, 9, and 10 must be executed 120×1280×1024=157,286,400 times per second, which is more than a hundred-fold increase in the amount required processing which cannot be performed on single-processor CPU's or DSP's because these devices are simply too slow. Indeed, nearly any marketable configuration of a 3D imaging system 30 utilizing an image intensifier 74 will require a pixel processing throughput that is greater than can be provided by a single CPU or DSP.

In addition, if there are 120×1280×1024=157,286,400 image pixels that must be transferred from the image sensor 70 to an image processing system 32 each second as cited in the above example, and each pixel comprises 10 bits of data, then the bit transfer rate from image sensor 70 to image processing system 32 must be 1,570,286,400 bits per second. This high rate of data transfer can be met economically only if there are more than one image sensor output lines between the image sensor 70 and image processing system 32 over which the digital image data can be communicated. Indeed, the NOIV1SN1300 image sensor 70 mentioned earlier has four image sensor output lines 71A through 71D over which four streams of image data are transferred between image sensor 70 and image processing system 32, although more lines can be beneficial for even faster frame rates.

In addition to multiple parallel image sensor output lines 71A through 71D, the length of each of the image sensor output lines 71A through 71D must be as short as possible. It is known in the art that, generally, the longer that a data communication line, or wire, is, the lower the bit-rate of binary data that can be communicated through the communication line due to increasing amounts of capacitance and inductance associated with longer wires. For prior art 3D imaging systems without image intensifiers (i.e., with lower resolution and slower frame rates) the communication line can comprises a single-wire coaxial cable a meter in length or longer to connect an image sensor to a remote single-processor CPU for image processing. For the purposes of examples of this technology with higher resolution and faster frame rates, and even with four or more image sensor output lines 71A through 71D, the image sensor output lines 71A through 71D must be kept under 20 cm in length, or preferably less than 8 cm in length, or more ideally less than 4 cm in length to maximize the image data transmission rate between the image sensor 70 and image processing system 32.

To further maximize the data transmission rate between the image sensor 70 and image processing system 32 the number of connectors must be minimized such that there are no connectors, or just one at the most, in image sensor output lines 71 which would add additional parasitic capacitance and inductance to the image sensor output lines 71 and thereby reduce the image data transmission rate between image sensor 70 and image processing system 32. Having one or no connectors in the image sensor output lines 71 and maintaining a reduced length of image sensor output lines 71 necessitates that both the image sensor 70 and image processing system 32 both be contained within the same housing or enclosure 96.

By way of example only, applications for this technology include guidance and navigation systems for autonomous and semi-autonomous vehicles, as well as collision avoidance for vehicular usage. This technology also can be used for consumer photography, augmented reality and virtual reality, as well as for cinematography. Security applications can include three-dimensional surveillance and facial recognition. Industrial applications are manifold, including robotics, parts sorting and bin picking, for example.

Having thus described the basic concept of the invention, it will be rather apparent to those skilled in the art that the foregoing detailed disclosure is intended to be presented by way of example only and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations, such as arrows in the diagrams therefore, is not intended to limit the claimed processes to any order or direction of travel of signals or other data or information except as may be specified in the claims. Accordingly, the invention is limited only by the following claims and equivalents thereto.

What is claimed is:

1. A three-dimensional (3D) imaging system comprising:
    an image capture system comprising an image intensifier comprising a photocathode, a micro-channel plate, and a fluorescent screen coupled to an input of an image sensor, the image sensor is configured to capture one two-dimensional (2D) image frame at a time based on light reflected from a target scene region and the image intensifier is configured to control gain of the captured 2D image in response to an image intensifier drive signal controlled by an image processing computing device; and
    the image processing computing device coupled to the image capture system, the image processing system comprising two or more processors and a memory comprising programmed instructions stored thereon, the processors configured to be capable of executing the stored programmed instructions to:
        break image data in the one captured 2D image frame into two or more 2D sub-images which together comprise the image data from the target scene region;
        execute one or more 3D image processing operations with the two or more processors operating in parallel on the two or more 2D sub-images that comprise the captured 2D image frame, the one or more 3D image processing operations comprising determining a phase or relative phase and amplitude at one or more pixels of the two or more 2D sub-images to develop a phase and distance map and pixel amplitude data for each of the pixels representing a relative reflectance;
        collect 3D sub-image data comprising the phase and distance map and the pixel amplitude data resulting from the execution of the one or more 3D image processing operations from each of the two or more processors operating in parallel; and assemble the collected 3D sub-image data into a unified 3D image of the target scene region.

2. The system as set forth in claim 1 wherein the image processing computing device comprises a field programmable gate array device.

3. The system as set forth in claim 1 wherein the image processing computing device comprises a complex programmable logic device (CPLD) device.

4. The system as set forth in claim 1 wherein the image processing computing device comprises a graphics processing unit (GPU) device.

5. The system as set forth in claim 1 wherein the image processing computing device comprises a multi-core CPU device.

6. The system as set forth in claim 5 wherein the image processing computing device and the image sensor are separated by a distance less than 8 cm.

7. The system as set forth in claim 6 wherein the image processing computing device and the image sensor are separated by a distance less than 4 cm.

8. The system as set forth in claim 1 wherein the image processing computing device and the image sensor are separated by a distance less than 20 cm.

9. A method for making a three-dimensional (3D) imaging system comprising:

providing an image capture system comprising an image intensifier comprising a photocathode, a micro-channel plate, and a fluorescent screen coupled to an input of an image sensor, the image sensor is configured to capture one two-dimensional (2D) image frame at a time based on light reflected from a target scene region and the image intensifier is configured to control gain of the captured 2D image in response to an image intensifier drive signal controlled by an image processing computing device; and coupling the image processing computing device to the image capture system, the image processing system comprising two or more processors and a memory comprising programmed instructions stored thereon, the processors configured to be capable of executing the stored programmed instructions to:

break image data in the one captured 2D image frame into two or more 2D sub-images which together comprise the image data from the target scene region;

execute one or more 3D image processing operations with the two or more processors operating in parallel on the two or more 2D sub-images that comprise the captured 2D image frame, the one or more 3D image processing operations comprising determining a phase or relative phase and amplitude at one or more pixels of the two or more 2D sub-images to develop a phase and distance map and pixel amplitude data for each of the pixels representing a relative reflectance;

collect 3D sub-image data comprising the phase and distance map and the pixel amplitude data resulting from the execution of the one or more 3D image processing operations from each of the two or more processors operating in parallel; and assemble the collected 3D sub-image data into a unified 3D image of the target scene region.

10. The method as set forth in claim 9 wherein the image processing computing device comprises a field programmable gate array device.

11. The method as set forth in claim 9 wherein the image processing computing device comprises a complex programmable logic device (CPLD) device.

12. The method as set forth in claim 9 wherein the image processing computing device comprises a graphics processing unit (GPU) device.

13. The method as set forth in claim 9 wherein the image processing computing device comprises a multi-core CPU device.

14. The method as set forth in claim 9 wherein the image processing computing device and the image sensor are separated by a distance less than 20 cm.

15. The method as set forth in claim 14 wherein the image processing computing device and the image sensor are separated by a distance less than 8 cm.

16. The method as set forth in claim 15 wherein the image processing computing device and the image sensor are separated by a distance less than 4 cm.

* * * * *